United States Patent [19]
Sakuma et al.

[11] Patent Number: 4,591,939
[45] Date of Patent: May 27, 1986

[54] WAVEFORM EQUIVALENT CIRCUIT

[75] Inventors: Masashi Sakuma; Kazuo Nakagoshi; Kazuhisa Shiraishi, all of Odawara; Shoji Ozaki, Kanagawa, all of Japan

[73] Assignee: Hitachi, Ltd., Tokyo, Japan

[21] Appl. No.: 664,341

[22] Filed: Oct. 24, 1984

[30] Foreign Application Priority Data

Oct. 25, 1983 [JP] Japan .................................. 58-199846

[51] Int. Cl.[4] .......................... G11B 5/09; G11B 15/14
[52] U.S. Cl. .......................................... 360/46; 360/65
[58] Field of Search ............................ 360/45, 46, 65; 333/28 R, 167

[56] References Cited

U.S. PATENT DOCUMENTS 4,276,573  6/1981  Halpern et al. ........................ 360/45
4,319,288  3/1982  Lee ........................................ 360/45

Primary Examiner—Vincent P. Canney
Attorney, Agent, or Firm—Antonelli, Terry & Wands

[57] ABSTRACT

A waveform equivalent circuit for correcting the asymmetry of the rising and falling slopes of an isolated signal waveform retrieved from a magnetic recording medium so as to restore an acute, symmetric isolated waveform. In operation, the input signal is phase-shifted and attenuated, and then added to the input signal to produce a smaller double peaked waveform, which is modified with an inverted and attenuated version of the input waveform. The input signal waveform is subtracted from the modified double peaked signal waveform to diminish both slope sections, and an acute, symmetric original signal waveform is recreated.

7 Claims, 11 Drawing Figures

H1 = H2

WAVEFORM EQUIVALENT CIRCUIT

BACKGROUND OF THE INVENTION

The present invention relates to a waveform equivalent circuit which shapes an isolated signal waveform and, more particularly, to a waveform equivalent circuit which corrects the asymmetry of each signal waveform retrieved from a magnetic recording medium by a magnetic head.

Generally, a magnetic recording apparatus, e.g., a magnetic disk unit, operates to record information in the form of digital data represented by "0"s and "1"s states of magnetism on the magnetic disk. Recently, in order to record a larger amount of information on a magnetic disk, information is recorded with a smaller interval between adjacent magnetic transitions on the magnetic disk. However, when such a record with a smaller transition interval is read out by a magnetic head, the adjoining magnetic states interfere with each other, causing the reproduced adjoining waveforms to shift away from each other. This phenomenon is called "pattern peak shift", and it reduces the amplitude and shifts the peak position of the signal, resulting in the failure of accurate reproduction of signals from the recording medium. On this account, magnetic recording apparatus designed for high density recording need a waveform equivalent circuit which modifies the reproduced waveform so that it has symmetric and acute slopes.

With regard to a technology of removing the pattern peak shift, reference may be made to U.S. Pat. No. 4,000,513 which discloses a technology of controlling a write timing of digital data to prevent the generation of peak shift in a reproduced waveform.

SUMMARY OF THE INVENTION

An object of the present invention is to provide a waveform equivalent circuit which reforms a distorted, isolated signal waveform into a symmetric waveform with acute slopes.

Another object of the present invention is to provide a waveform equivalent circuit which gets rid of a pattern peak shift in an isolated signal waveform retrieved from a magnetic recording medium and, at the same time, reforms the waveform so that it has acute slopes.

According to one aspect of this invention, the circuit comprises a first means which delays a first isolated signal waveform by a time length of $\tau$ to produce a second waveform, a second means which produces a double peaked waveform using the first and second waveforms, a third means which produces a fourth waveform by inverting the first waveform, a fourth and fifth means which produce a fifth and sixth waveforms by attenuating the third and fourth waveforms, respectively, a sixth means which produces a seventh waveform by adding the sixth waveform to the fifth waveform, and a seventh means which subtracts the seventh waveform from the second waveform.

According to another aspect of this invention, the circuit comprises a delay element, grounded-collector circuits, attenuators, and differential amplifiers.

DESCRIPTION OF THE PREFERRED EMBODIMENTS

Figure 1:
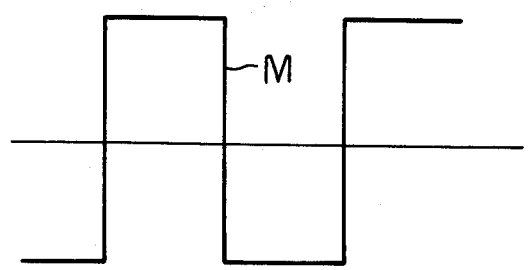
FIG. 1 is a waveform diagram showing, as an example, the signal waveform written to the magnetic recording medium.
Figure 2:
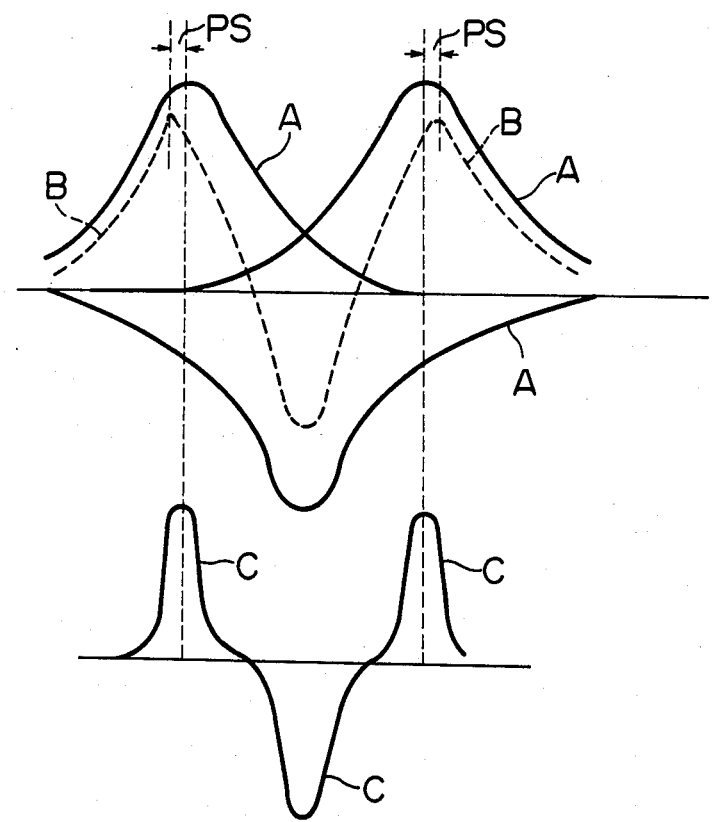
FIG. 2 is a diagram used to explain the reproduced waveform for the signal shown in FIG. 1 recorded on the magnetic recording medium.

Generally, digital data is recorded on a magnetic recording medium by a magnetic head in alternating magnetized states M as shown in FIG. 1. When the magnetized states recorded densely on the recording medium are reproduced by the magnetic head, a signal waveform C composed of two convex components and a concave component shown by the solid lines A is expected to result as shown in FIG. 2. In actuality, however, due to high density recording, the slopes of the two convex components of the reproduced signal overlap with each other and repel each other, resulting in a shifted waveform shown by the dashed line B. The waveform B has peaks shifted oppositely from each other by a length PS with respect to the original peak position with a diminished amplitude. This phenomenon is called "pattern peak shift".

If the peak shift PS increases, the magnetic recording apparatus cannot read out information at the point at which the information has been written, causing a read error, and this gives the limit of recording density. In order to modify the interference waveform B having a large peak shift PS, and to restore the isolated sharp waveform, a waveform equivalent circuit is required.

Figure 3:
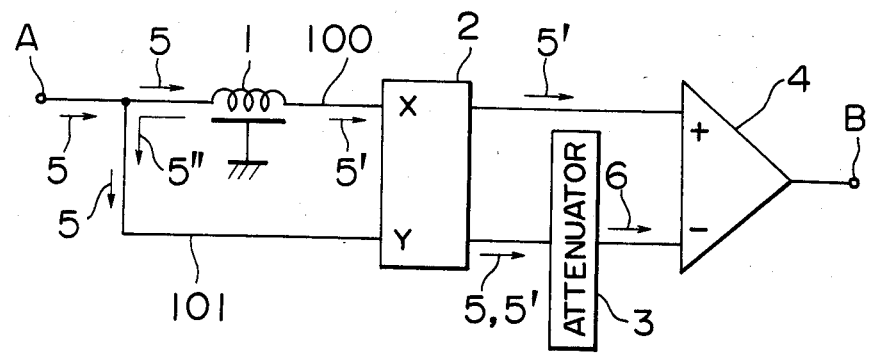
FIG. 3 is a block diagram showing an example of the waveform equivalent circuit.
Figure 4:
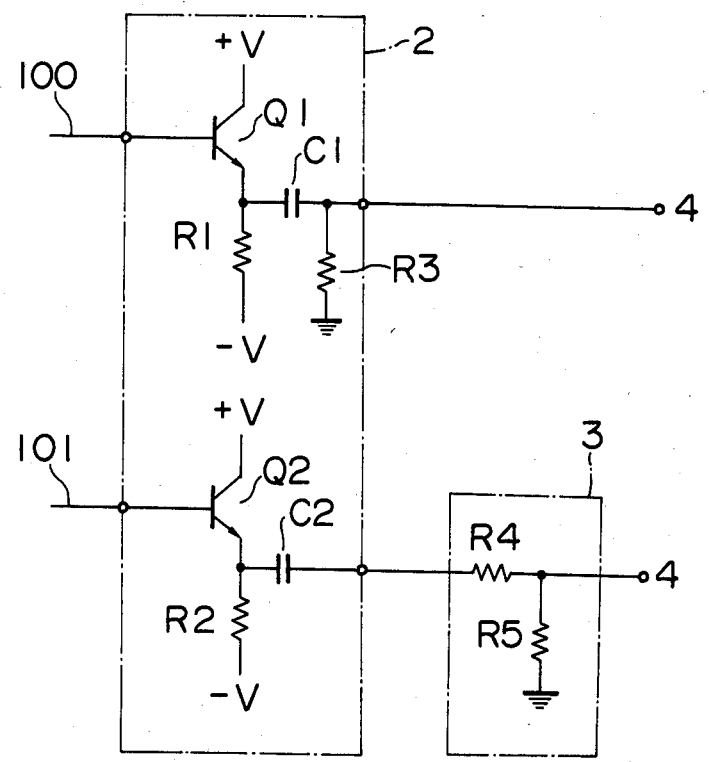
FIG. 4 is a schematic diagram showing the arrangement of the grounded-collector circuits and attenuator shown in FIG. 3.

The inventors of this invention have studied the waveform equivalent circuit shown in FIG. 3. This waveform equivalent circuit comprises a delay line 1 which applies delay to the signal received at an input terminal A by a time length of $1\tau$, an attenuator 3 which attenuates the input signal with a certain damping factor, a differential amplifier 4 which amplifies the difference of two input signals, and a pair of grounded-collector circuits 2. The grounded-collector circuit 2 is made up of a transistor Q1 with its base connected with a signal line 100, its collector connected to a $+V$ voltage source and its emitter connected through a resistor R1 to a $-V$ voltage source, a d.c. blocking capacitor C1 with its one terminal connected between the emitter of the Q1 and the resistor R1, a biasing resistor R3 grounding another terminal of the capacitor C1, and a transistor Q2 with its base connected with a signal line 101 and its emitter connected to a resistor R2 and a capacitor C2. The attenuator 3 is made up of a resistor R4 with its one terminal receiving the output of the grounded-collector circuit 2, and a resistor R5 grounding another terminal of the R4. The grounded-collector circuit 2 connected with the signal line 100 has a very large input impedance as compared with the characteristic impedance of the delay line 1.

Figure 5:
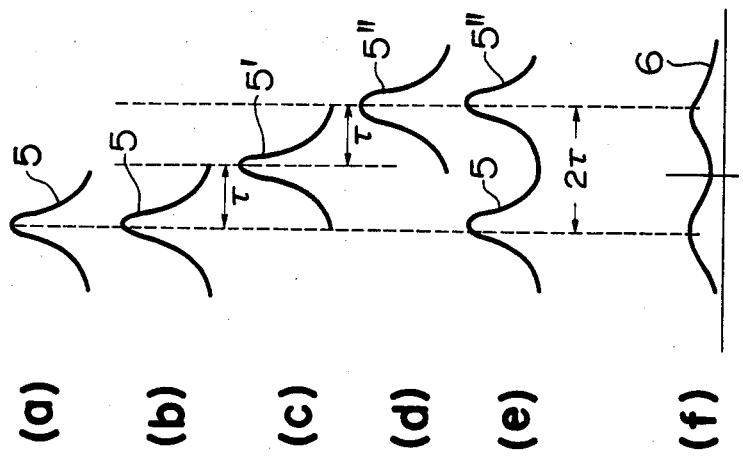
FIG. 5, a through $f_1$ is a set of waveform diagrams used to explain the process for a waveform entered to the waveform equivalent circuit shown in FIG. 3.

In the waveform equivalent circuit arranged as mentioned above, a signal waveform shown in FIG. 5(a) received at the input terminal A is conducted to the lines 100 and 101. The waveform 5 coming along the line 100 is delayed by the delay line 1 by a time length of $1\tau$ to become a waveform 5' (shown in FIG. 5(c)) and it is applied to terminal X of the grounded-collector circuit 2. However, because of the high input impedance of the circuit 2, the signal is totally reflected and conducted back through the delay line 1 to become a waveform 5'' (shown in FIG. 5(d)) with a delay of $2\tau$ with respect to the waveform 5 while at the same time the waveform 5' is propagated through the circuit 2. This waveform 5'' is added to the input waveform 5 on the line 101, and a signal of two isolated waveforms as shown in FIG. 5(e) is produced. This signal is applied to terminal Y of the grounded-collector circuit 2 so that it is impedance converted, and attenuated by a certain amount by the attenuator 3 to become a waveform 6 shown in FIG. 5(f).

Figure 6A:
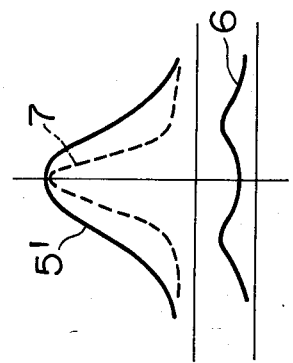
FIGS. 6(a) and 6(b) are waveform diagrams used to explain the distortion of the reproduced waveform processed by the waveform equivalent circuit shown in FIG. 3.
Figure 6B:
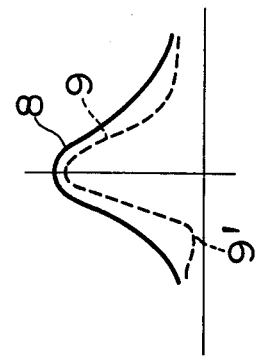

The differential amplifier 4 receives the waveform 5' at its positive input terminal and the waveform 6 at its negative input terminal, and provides a differential sharp waveform 7 as shown in FIG. 6(a) at its output terminal B. In actuality, however, an isolated waveform retrieved from the magnetic recording medium by the magnetic head is apt to be asymmetric with respect to the peak axis as shown by 8 in FIG. 6(b) due to the characteristics of the magnetic head, and this causes a peak shift. Application of the waveform 8 to the waveform equivalent circuit shown in FIG. 3 does not produce a symmetric output waveform as shown by 9, and moreover may even produce an undershoot 9' on one side. The composite process for such isolated waveforms causes a peak shift, resulting in a decreased phase margin of the recording/reproduction system.

Figure 7:
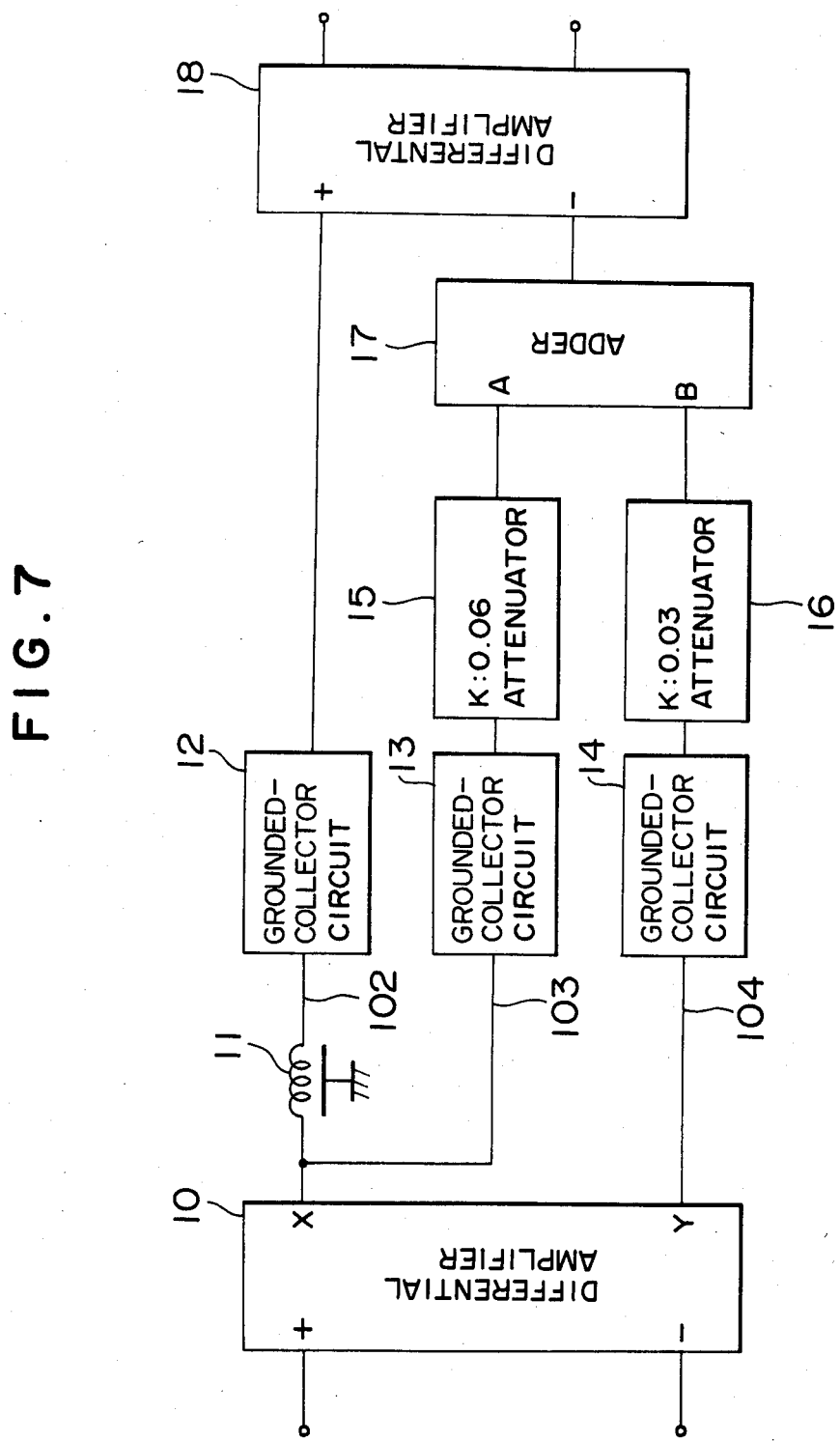
FIG. 7 is a block diagram showing the waveform equivalent circuit embodying the present invention.

The waveform equivalent circuit according to the present invention functions to get rid of the effect of undershoot. FIG. 7 shows an embodiment of the inventive waveform equivalent circuit. The arrangement includes a differential amplifier 10 receiving a reproduced waveform at its positive input terminal and an inverted version of the reproduced waveform at its negative input terminal, a first circuit line 102 running from the X output terminal of the differential amplifier 10 through a delay line 11 and a grounded-collector circuit 12, a second circuit line 103 running from the X output terminal of the differential amplifier 10 through a grounded-collector circuit 13 and an attenuator 15, a third circuit line 104 running from the Y output terminal of the differential amplifier 10 through a grounded-collector circuit 14 and an attenuator 16, an adder 17 for adding the outputs on the second and third circuit lines, and a differential amplifier 18 which receives the output on the first circuit line 102 at its positive input terminal and the output of the adder 17 at its negative input terminal and amplifies the difference of these inputs.

Figure 8:
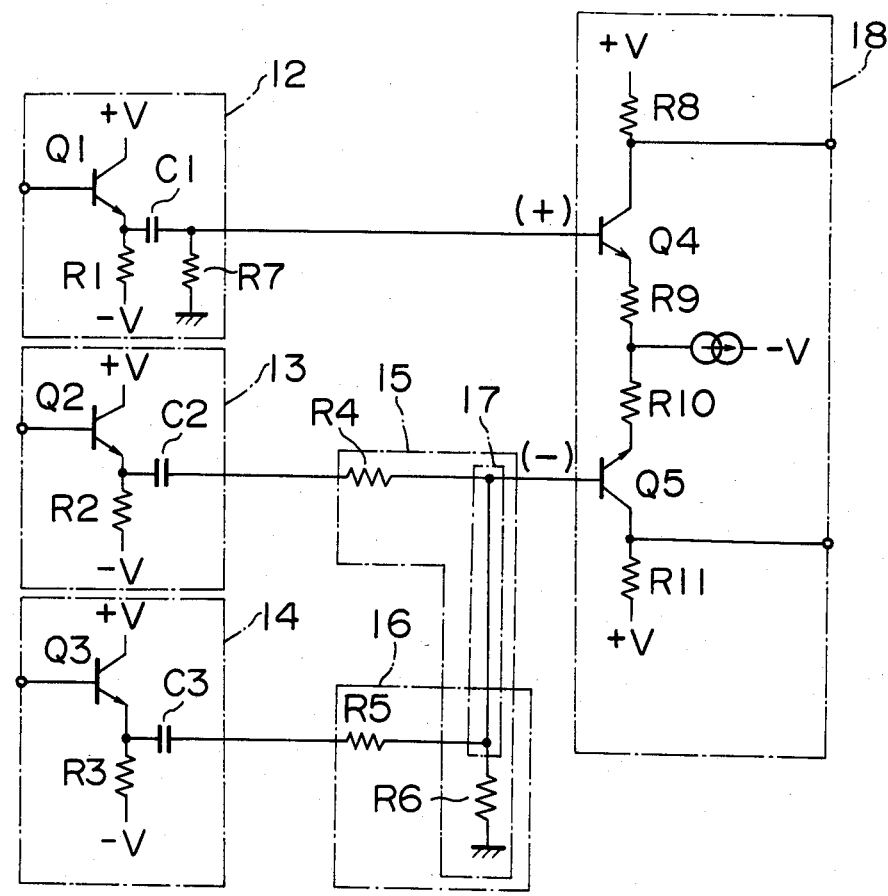
FIG. 8 is a schematic diagram showing the arrangement of the grounded-collector circuits, attenuator and differential amplifiers shown in FIG. 7.

FIG. 8 shows the detailed arrangement of the grounded-collector circuits 12, 13 and 14, attenuators 15 and 16, adder 17, and differential amplifier 18 shown in FIG. 7. The grounded-collector circuit 12 is made up of an NPN transistor Q1 with its base connected with the input signal line, its collector connected to a +V voltage source, and its emitter connected through a resistor R1 to a −V voltage source, a d.c. blocking capacitor C1 with its one terminal connected to the emitter of the Q1, and a base biasing resistor R7 grounding another terminal of the C1. The grounded-collector circuit 13 is made up of an NPN transistor Q2 with its base connected with the input signal line, its collector connected to the +V voltage source, and its emitter connected through a resistor R2 to the −V voltage source, and a d.c. blocking capacitor C2 with its one terminal connected to the emitter of the Q2. The grounded-collector circuit 14 is arranged identically to the circuit 13, and is made up of an NPN transistpr Q3, a resistor R3 and a d.c. blocking capacitor C3.

The attenuators 15 and 16 are made up of voltage dividing resistors R4, R5 and R6, and the adder 17 is in this embodiment simply a node of the output lines from the attenuators 15 and 16. The differential amplifier 18 is made up of an NPN transistor Q4 with its base connected to the positive input terminal of the amplifier, an NPN transistor Q5 with its base connected to the negative input terminal of the amplifier, a circuit for providing a −V voltage for the emitter of the Q4 and Q5 through respective resistors R9 and R10, and a circuit for providing a +V voltage for the collector of the Q4 and Q5 through respective resistors R8 and R11.

Next, the operation of each circuit block will be described. The differential amplifier 10 has an output impedance equal to the characteristic impedance of the delay line 11, which applies delay of a certain time length ($\tau$) to the input signal. The grounded-collector circuits 12, 13 and 14 are used for impedance conversion. The attenuators 15 and 16 attenuate the amplitude of the input signal with certain damping factors K1 and K2. The adder 17 adds a signal waveform at its A terminal and a signal waveform at its B terminal, and provides a composed signal waveform. The differential amplifier 18 produces a signal waveform by subtracting a signal waveform at its negative input terminal from a signal waveform at its positive input terminal.

In the waveform equivalent circuit shown in FIG. 7, a waveform is conducted through the delay line 11 and reflected at the input of the grounded-collector circuit 12 back through the delay line 11 (i.e., the waveform received by the grounded-collector circuit 13) and the waveform in opposite polarity (i.e., the waveform received by the grounded-collector circuit 14) are subjected to amplitude attenuation with the respective damping factors of the attenuators 15 and 16, respectively, and then added by the adder 17, which provides a resultant waveform to the negative terminal of the differential amplifier 18. Through these processes, a waveform having two peaks with different amplitudes located at the right and left of the peak of the waveform at the end of the delay line 11 is produced, and through the subtraction of this waveform from the waveform at the end of the delay line 11, an acute pulse waveform which is symmetric with respect to the peak can be obtained.

Figure 9:
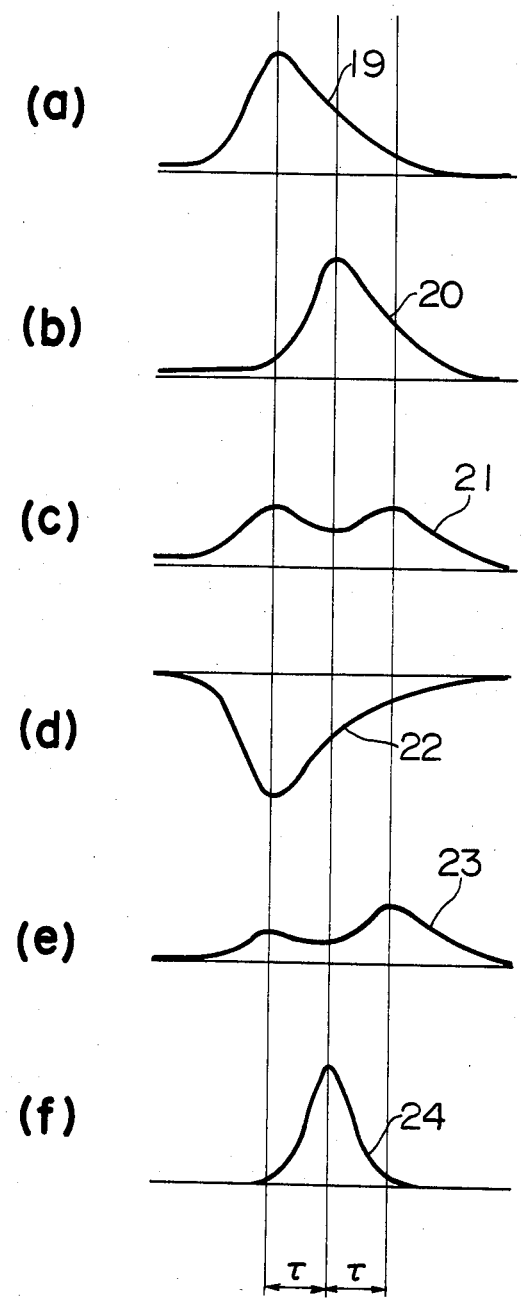
FIG. 9 a through f is a set of waveform diagrams used to explain the processes for the reproduced waveform by the waveform equivalent circuit shown in FIG. 7.

The operation will further be described with reference to FIG. 9. When an asymmetric signal waveform 19 shown in FIG. 9(a) is fed to the positive input terminal of the differential amplifier 10, it is amplified and sent out from the X terminal. The output is fed through the delay line 11 to the grounded-collector circuit 12, and at the same time directly to the grounded-collector circuit 13. Since the grounded-collector circuit 12 is made to have an input impedance extremely larger than the characteristic impedance of the delay line 11, the signal waveform is totally reflected at the input of the circuit 12 and propagated back through the delay line 11. This signal waveform is added to the signal waveform at the X terminal of the differential amplifier 10, and the resultant signal waveform is fed to the grounded-collector circuit 13. In this case, reflection does not take place, since the output impedance of the differential amplifier 10 is matched to the characteristic impedance of the delay line 11.

Accordingly, the grounded-collector circuit 12 receives a waveform 20 which has been delayed by a delay time $\tau$ of the delay line 11 relative to the waveform 19 supplied to the differential amplifier 10, as shown in FIG. 9(b). The grounded-collector circuit 13 receives a waveform 21 having two peaks, one being in phase with the waveform 19 supplied to the differential amplifier 10 and another being delayed by a time length of $2\tau$, as shown in FIG. 9(c). The output of the grounded-collector circuit 12 is fed to the positive input of the differential amplifier 18, while the output of the grounded-collector circuit 13 is fed through the attenuator 15, by which the amplitude is attenuated with a certain damping factor (K1), and applied to the A terminal of the adder 17.

On the other hand, the differential amplifier 10 provides at its Y terminal another output waveform 22 shown in FIG. 9(d) in opposite polarity relationship with the waveform 19, and it is fed through the grounded-collector circuit 14, attenuated with a certain damping factor (K2) by the attenuator 16, then applied to the B terminal of the adder 17. The adder 17 adds the waveforms at its A and B terminals to produce a waveform 23 shown in FIG. 9(e), and it is fed to the negative terminal of the differential amplifier 18. Adding the waveform 21 shown in FIG. 9(c) to the waveform 22 shown in FIG. 9(d) causes the left-hand peak of the waveform 22 to be largely diminished, while leaving the right-hand peak substantially unchanged, resulting in the creation of a waveform 23 having two peaks with different amplitude.

Figure 10:
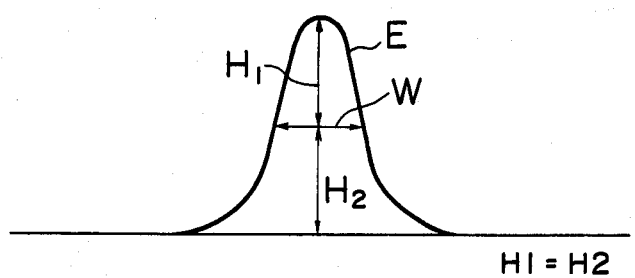
FIG. 10 is a waveform diagram showing an example of the recreated waveform.

The differential amplifier 18 subtracts the waveform 23 at its negative input terminal from the waveform 20 at its positive input terminal, causing the right-hand slope of the 20 to be greatly reduced, resulting in an acute, symmetric waveform 24 as shown in FIG. 9(f). The waveform 24 shown in FIG. 9(f) is obtained by appropriately choosing the delay time $\tau$ of the delay line 11 and the damping factors K1 and K2 of the attenuators 15 and 16. One experimental result shows that for a recording system handling an isolated waveform E with a mesial magnitude width W of 3 $\mu$s as shown in FIG. 10, an acute symmetric waveform with an improved phase margin of 150 ns was achieved by setting the values of the parameters as delay time $\tau = 1.6$ $\mu$s, and damping factors K1=0.6 and K2=0.03.

According to the present invention, as described above, the signal waveform reproduced magnetically on a recording medium can be modified so that it has a symmetric profile with a small mesial magnitude width and an acute peak, whereby the reading phase margin of the magnetic recording/reproduction system can be improved.

We claim:

1. A waveform equivalent circuit for correcting the asymmetry of the rising and falling slopes of a first convex signal waveform comprising:
    first means for delaying said first signal waveform by a time length of $\tau$ to produce a second waveform;
    second means for producing a third signal waveform by adding said first signal waveform and a signal waveform derived from said first signal waveform, but delayed by a time length of $2\tau$;
    third means for producing a fourth signal waveform by inverting said first signal waveform;
    fourth means for producing a fifth signal waveform by attenuating said third signal waveform with a damping factor K1;
    fifth means for producing a sixth signal waveform by attenuating said fourth signal waveform with a damping factor K2 larger than said damping factor K1;
    sixth means for producing a seventh signal waveform by adding said fifth and sixth signal waveforms; and
    seventh means for subtracting said seventh signal waveform from said second signal waveform.

2. A waveform equivalent circuit according to claim 1, wherein said fourth and fifth means in combination comprise a first resistor with its one terminal receiving said third signal waveform, a second resistor with its one terminal receiving said fourth signal waveform, and a third resistor grounding another terminals of said first and second resistors, and wherein said sixth means includes a node of said another terminals of said first and second resistors.

3. A waveform equivalent circuit according to claim 1, wherein said fourth and fifth means are adapted to have damping factors K1 and K2 of 0.6 and 0.03, respectively, and said first means is adapted to have a delay time $\tau$ of 1.6 $\mu$s for a case of said first convex signal waveform having a width at the mesial magnitude of 3 $\mu$s.

4. A waveform equivalent circuit for correcting the asymmetry of the rising and falling slopes of a first convex signal waveform retrieved from a magnetic recording medium comprising:
    a delay element which receives said first signal waveform and produces a second signal waveform by delaying said first signal waveform by a time length of $\tau$;
    a first grounded-collector circuit which has an input impedance larger than the characteristic impedance of said delay element, said first circuit performing impedance conversion and reflection for the second signal waveform from said delay element;
    a second grounded-collector circuit which receives a third signal waveform composed of said first signal waveform and a signal waveform reflected by said first grounded-collector circuit back through said delay element so that it is delayed by a time length of $2\tau$ relative to the delay time of the second signal waveform, said second circuit performing impedance conversion;
    a third grounded-collector circuit which receives a fourth signal waveform that is an inverted version of said first signal waveform, said third circuit performing impedance conversion;
    a first attenuator which attenuates the third signal waveform provided by said second grounded-collector circuit with a damping factor of K1 to produce a fifth signal waveform;

a second attenuator which attenuates the fourth signal waveform provided by said third grounded-collector circuit with a damping factor of K2 larger than said damping factor K1 to produce a sixth signal waveform;

an adder which adds the fifth signal waveform provided by said first attenuator and the sixth signal waveform provided by said second attenuator to produce a seventh signal waveform; and a differential amplifier which subtracts the seventh signal waveform provided by said adder from the second signal waveform provided by said first grounded-collector circuit, said amplifier performing differential signal amplification.

5. A waveform equivalent circuit according to claim 4, wherein said first grounded-collector circuit comprises a first transistor with its collector electrode connected to a positive voltage source, its emitter electrode connected through a first resistor to a negative voltage source and, at the same time, connected with a first capacitor with its opposite side being grounded through a second resistor, and its base electrode receiving said second signal waveform, said first capacitor providing on said opposite side an impedance-converted version of the second signal waveform, and wherein said second grounded-collector circuit comprises a second transistor with its collector electrode connected to the positive voltage source, its emitter electrode connected through a third resistor to the negative voltage source and, at the same time, connected with a second capacitor, and its base electrode receiving said third signal waveform, said second capacitor providing on its opposite side an impedance-converted version of the third signal waveform, and wherein said third grounded-collector circuit comprises a third transistor with its collector electrode connected to the positive voltage source, its emitter electrode connected through a fourth resistor to the negative voltage source and, at the same time, connected to a third capacitor, and its base electrode receiving said fourth signal waveform, said third capacitor provided on its opposite side an impedance-converted version of the fourth signal waveform.

6. A waveform equivalent circuit according to claim 4, wherein said first attenuator is adapted to have a damping factor K1 of 0.6, said second attenuator is adapted to have a damping factor K2 of 0.03, and said delay element is adapted to have a delay time of 1.6 $\mu$s for a case of said first convex signal waveform having a width at the mesial magnitude of 3 $\mu$s.

7. A waveform equivalent circuit according to claim 4, wherein said magnetic recording medium comprises a magnetic disk.

* * * * *